(12) United States Patent
Putcha et al.

(10) Patent No.: US 10,540,632 B2
(45) Date of Patent: Jan. 21, 2020

(54) SYSTEMS AND METHODS FOR PROVIDING SUBSTITUTE PRODUCTS IN PLACE OF ORDERED PRODUCTS THAT ARE OUT OF STOCK

(71) Applicant: Walmart Apollo, LLC, Bentonville, AR (US)

(72) Inventors: Sai Phaneendra Sri Harsha Viswanath Putcha, Bentonville, AR (US); Donald R. High, Noel, MO (US); Chandrashekar Natarajan, Valencia, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 341 days.

(21) Appl. No.: 15/413,776

(22) Filed: Jan. 24, 2017

(65) Prior Publication Data

US 2017/0220986 A1    Aug. 3, 2017

Related U.S. Application Data

(60) Provisional application No. 62/290,747, filed on Feb. 3, 2016.

(51) Int. Cl.
| | | |
|---|---|---|
| *G06Q 30/00* | (2012.01) | |
| *G06Q 10/08* | (2012.01) | |
| *G06Q 20/10* | (2012.01) | |
| *G06Q 30/06* | (2012.01) | |
| *G08B 21/18* | (2006.01) | |

(52) U.S. Cl.
CPC ......... *G06Q 10/087* (2013.01); *G06Q 20/102* (2013.01); *G06Q 30/0631* (2013.01); *G06Q 30/0633* (2013.01); *G08B 21/18* (2013.01)

(58) Field of Classification Search
USPC ....................................................... 705/26.1
See application file for complete search history.

(56) References Cited

U.S. PATENT DOCUMENTS

| | | |
|---|---|---|
| 6,199,753 B1 | 3/2001 | Tracy |
| 6,970,837 B1 | 11/2005 | Walker |
| (Continued) | | |

OTHER PUBLICATIONS

International Search Report and Written Opinion in PCT App. No. PCT/US17/15559; dated Apr. 5, 2017; (17 pgs.).

*Primary Examiner* — Mila Airapetian
(74) *Attorney, Agent, or Firm* — Fitch, Even, Tabin and Flannery, LLP

(57) ABSTRACT

In some embodiments, methods and systems of enabling consumers to purchase substitute products when the products ordered by the consumers are out of stock include processing an internet order for a product received from a consumer in a geographic location and in response to receiving an electronic notification indicating that the product ordered by the consumer is out of stock at a retail sales facility associated with the geographic location of the consumer, generating an electronic message including an indication that the product ordered by the consumer is out of stock at the retail sales facility, and including a selection option of at least one substitute product for the product ordered by the consumer. The methods and system further include transmitting the electronic message from the electronic inventory management device at the retail sales facility to an electronic computing device of the consumer.

18 Claims, 3 Drawing Sheets

(56) References Cited

U.S. PATENT DOCUMENTS

| | | | |
|---|---|---|---|
| 8,112,317 B1* | 2/2012 | Ballaro | G06Q 10/087 705/26.1 |
| 8,751,334 B2 | 6/2014 | Wijaya | |
| 9,202,246 B1 | 12/2015 | Bundy | |
| 10,055,784 B1* | 8/2018 | Boelter | G06F 16/9535 |
| 2002/0077937 A1 | 6/2002 | Lyons | |
| 2004/0117276 A1 | 6/2004 | Kettler | |
| 2004/0138921 A1 | 7/2004 | Broussard | |
| 2007/0210155 A1 | 9/2007 | Swartz | |
| 2007/0233507 A1 | 10/2007 | Publicover | |
| 2008/0281712 A1 | 11/2008 | Fuzell-Casey | |
| 2009/0125411 A1* | 5/2009 | Otto | G06Q 20/16 705/34 |
| 2012/0253972 A1 | 10/2012 | Oskolkov | |
| 2014/0089133 A1* | 3/2014 | Argue | G06Q 30/0282 705/26.7 |
| 2014/0180785 A1 | 6/2014 | Argue | |
| 2014/0180865 A1 | 6/2014 | Argue | |
| 2014/0279278 A1 | 9/2014 | Wijaya | |
| 2014/0279294 A1 | 9/2014 | Field-Darragh | |
| 2016/0171432 A1* | 6/2016 | Pugh | G06Q 10/087 705/14.23 |

* cited by examiner

SYSTEMS AND METHODS FOR PROVIDING SUBSTITUTE PRODUCTS IN PLACE OF ORDERED PRODUCTS THAT ARE OUT OF STOCK

RELATED APPLICATIONS

This application claims the benefit of U.S. Provisional Application No. 62/290,747, filed Feb. 3, 2016, which is incorporated herein by reference in its entirety.

TECHNICAL FIELD

This invention relates generally to facilitating a consumer in purchasing products online and, in particular, to systems and methods for enabling a consumer to purchase one or more substitute products when the products ordered by the consumers are out of stock.

BACKGROUND

Many consumers of retail stores order products over the internet. Some products that are commonly ordered over the internet may include, for example, household items (e.g., cleaning supplies, soap, shampoo, toothpaste, etc.), office supplies (e.g., paper, ink, writing instruments), prescription and over-the-counter medication, and dietary supplements just to name a few. Typically, consumers order a product on a website operated by a retail provider (e.g., Walmart/Sams Club) by browsing for the product of interest on the retail provider's website, adding the product of interest to a virtual shopping cart on the retail provider's website, then proceeding to checkout by providing a payment method (e.g., credit card information) to purchase the product in the shopping cart. When products ordered by the consumers using such website-based product ordering systems are determined to be out of stock, the retail providers typically deliver to the consumers substitute products chosen by the retail provider.

One disadvantage of such systems is that generally, consumers know which products they like and expect to receive the exact product they ordered, and are often not happy when they are surprised with a different product. Another disadvantage is that the consumers may choose to return the substitute product to the retail providers, forcing the retail provider to incur the transportation cost of the substitute products back to the facility of the retail providers. Other disadvantages are that the retail providers may not only suffer a loss of sale, but may also lose its customers, who may become unhappy with the retail provider's delivery of a substitute product, and who may turn to another retail provider who has the customers' desired product in stock. Such disadvantages negatively affect the retail providers' profits by increasing shipping costs and reducing total number of sales, and negatively affect the consumers' satisfaction with the retail providers, potentially leading to a loss of customers for the retail providers.

BRIEF DESCRIPTION OF THE DRAWINGS

Disclosed herein are embodiments of systems, apparatuses, methods, and systems pertaining to enabling consumers to purchase substitute products when the products ordered by the consumers are out of stock. This description includes drawings, wherein.

Figure 1:
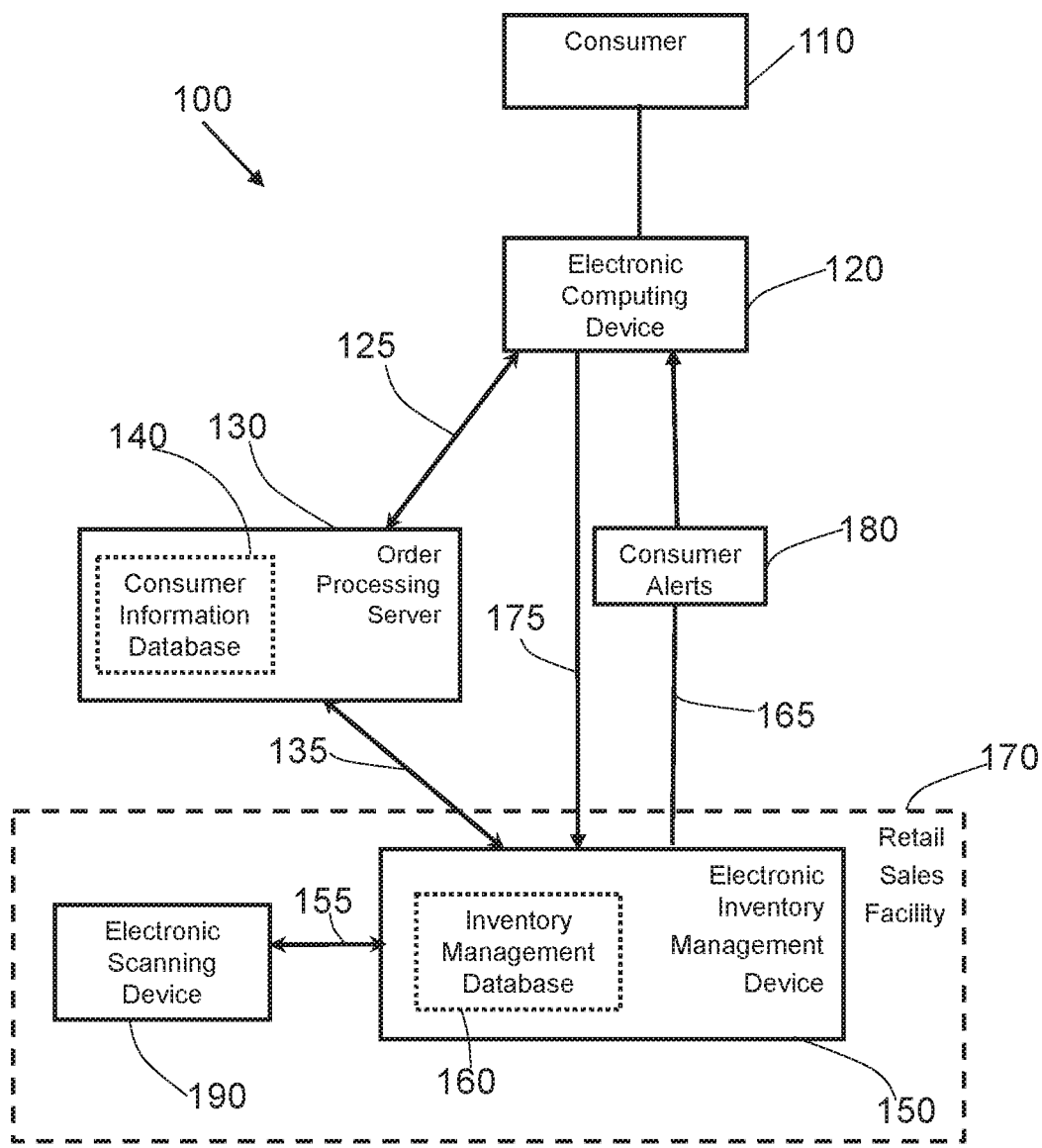
FIG. 1 is a diagram of a system for enabling consumers to purchase substitute products when the products ordered by the consumers are out of stock in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for enabling consumers to purchase one or more alternative products when a product ordered by the consumer is out of stock. The methods and systems generally provide for electronic messages to be sent to consumers indicating to the consumers that the products ordered by the consumers are out of stock In one embodiment, a system of enabling consumers to purchase substitute products when the products ordered by the consumers are out of stock includes: an order processing server configured to receive an internet order for a product from a consumer in a geographic location; an electronic inventory management electronic device at a retail sales facility associated with the geographic location of the consumer, the electronic inventory management device including a processor-based control unit configured to: receive an electronic notification indicating that the product ordered by the consumer is out of stock at the retail sales facility; generate an electronic message including an indication that the product ordered by the consumer is out of stock at the retail sales facility and including a selection option of at least one substitute product for the product ordered by the consumer; and transmit the electronic message to an electronic computing device of the consumer.

In another embodiment, a d of enabling consumers to purchase substitute products when the products ordered by the consumers are out of stock includes: processing, at an order processing server, an internet order for a product received from a consumer in a geographic location; receiving, at an electronic inventory management device at a retail sales facility associated with the geographic location of the consumer, an electronic notification indicating that the product ordered by the consumer is out of stock at the retail sales facility; generating, at an electronic inventory management device at the retail sales facility, an electronic message including an indication that the product ordered by the consumer is out of stock at the retail sales facility and including a selection option of at least one substitute product for the product ordered by the consumer; and transmitting the electronic message from the electronic inventory management device at the retail sales facility to an electronic computing device of the consumer.

In yet another embodiment, a system of enabling consumers to purchase substitute products when the products ordered by the consumers are out of stock includes: means for processing an internet order for a product received from a consumer in a geographic location; means for receiving, an electronic notification indicating that the product ordered by the consumer is out of stock at a retail sales facility associated with the geographic location of the consumer; means for generating an electronic message including an indication that the product ordered by the consumer is out of stock at the retail sales facility and including a selection option of at least one substitute product for the product ordered by the consumer; and means for transmitting the electronic message to an electronic computing device of the consumer.

FIG. 1 shows an embodiment of a system 100 for enabling a consumer 110 to purchase substitute products when the products ordered by the consumer 110 are out of stock at a retailer provider's retail sales facility 170. The retail sales facility 170 may be any place of business operating as a brick-and-mortar physical location and/or a website accessible via the internet by way of which consumer products may be ordered by the consumer 110. Exemplary products that may be ordered by the consumer 110 via the system 100 may include, but are not limited to, general-purpose consumer goods, as well as consumable products, such as medications, food items, and dietary supplements.

The exemplary system 100 depicted in FIG. 1 includes an electronic computing device 120 available to the consumer 110 and configured to receive information from and to transmit information to, an order processing server 130 and/or an electronic inventory management device 150 of a retail provider. For example, such information may include but is not limited to information associated with one or more products to be ordered and/or previously ordered by or for the consumer 110 from the retail provider.

In some embodiments, the electronic computing device 120 may be a stationary, portable, and/or hand-held consumer electronic device, for example, a desktop computer, a laptop computer, a tablet, a mobile phone, a smart television, or any other electronic, processor-based device that may be configured for data entry and communication with another electronic, processor-based device at a location operated by or for the retail provider.

In some embodiments, instead of being an electronic computing device 120 of the consumer 110 as described above, the electronic computing device 120 may be a stationary or portable electronic device installed or otherwise operatively connected at the brick-and-mortar retail sales facility 170 of the retail provider. Examples of such electronic computing devices installed or otherwise operatively connected at the retail sales facility 170 of the retail provider may include, but are not limited to, a kiosk or a kiosk-type computing station available to a consumer 110 at the retail sales facility 170 of the retail provider, mounted product scanner, or another electronic computing device configured to permit a consumer to scan a product at the retail sales facility 170. As such, the electronic computing device 120 may communicate with the order processing server 130 and/or the electronic inventory management device 150 via a wide-area network (WAN), a local area network (LAN), a personal area network (PAN) or any other internet or intranet network. In some embodiments, the communications between the devices of the exemplary system 100 may take place over hard-wired, cellular, Wi-Fi or Bluetooth networked components or the like. In some embodiments, one or more electronic devices (e.g., order processing server 130 and electronic inventory management device 150 of system 100 may include cloud-based features, such as cloud-based memory storage.

The exemplary system 100 shown in FIG. 1 includes an order processing server 130 in two-way communication with the electronic computing device 120 via a communication channel 125. The communication channel 125 may be a wired or wireless connection. The order processing server 130 may be implemented as one server at one location (e.g., at the retail provider's retail sales facility 170, or at a retail provider's regional or central location specifically dedicated to server storage). Alternatively, the order processing server 130 may be implemented as multiple interconnected servers stored at one or more locations operated by or for the retail provider.

The order processing server 130 may include a consumer information database 140, as shown in FIG. 1. In some embodiments, the consumer information database 140 may be configured to store information associated with a consumer 110 who orders products from the retail provider. It will be appreciated that the order processing server 130 may also include a database storing information associated with the inventory of products available to the consumer 110 for purchase over the internee from the retail provider. In other words, while the order processing server 130 is illustrated in FIG. 1 as including one database, the consumer information database 140, it will be appreciated that the order processing server 130 may include two or more databases configured to store consumer information and/or product inventory information.

The consumer information database 140 may be stored, for example, on non-volatile storage media (e.g., a hard drive, flash drive, or removable optical disk) internal or external to the order processing server 130, or internal or external to computing devices separate and distinct from the order processing server 130. It will be appreciated that the consumer information database 140 may likewise be cloud-based. In some embodiments, the consumer information database 140 may store electronic information associated with the consumer 110, such as the consumer's product order history, pending order status, personal information, product order options, and substitute product options. The consumer information database 140 is configured to update any information stored therein in association with the consumer 110 based on receiving a transmission from the electronic computing device 120 of the consumer 110 requesting to update such information.

While the order processing server 130 may be in direct two-way communication with the electronic computing device 120 via the communication channel 125 as shown in FIG. 1, it will be appreciated that the electronic computing device 120 may be in two-way communication with the order processing server 130 indirectly via one or more intermediate servers or other electronic communication devices. It will likewise be appreciated that the system 100 may be confined to a single retail sales facility 170 of the retail provider, such that neither the electronic computing device 120 nor the order processing server 130 is required to communicate with a device or server remote to the retail sales facility 170 of the retail provider.

In the exemplary system 100 shown in FIG. 1, the order processing server 130 is in two-way communication with an electronic inventory management device 150 via a communication channel 135. The communication channel 135 may be a wired or wireless connection. In some embodiments, the order processing server 130 is configured to receive and process an order by a consumer for a product from an electronic computing device 120, to receive and process payment for the product from the consumer 110, and to transmit a fulfillment request for the processed order (e.g., via the communication channel 135) to the electronic inventory management device 150 at the retail sales facility 170 of the retailer associated with the geographic location of the consumer 110 who placed the order.

The electronic inventory management device 150 illustrated in FIG. 1 may be implemented as a single device at the retail sales facility 170 of the retail provider associated with the geographic location of the consumer 110. It will be appreciated, however, that the electronic inventory management device 150 may be located at the retail provider's regional or central location dedicated to inventory management database storage. In the embodiment of FIG. 1 the electronic inventory management device 150 includes an inventory management database 160. The inventory management database 160 may be stored, for example, on non-volatile storage media (e.g., a hard drive, flash drive, or removable optical disk) internal or external to the electronic inventory management device 150, or internal or external to computing devices separate and distinct from the electronic inventory management device 150. It will be appreciated that the inventory management database 160 may likewise be cloud-based.

The exemplary inventory management database 160 of FIG. 1 is configured to store electronic data associated with the products at the retail sales facility 170 including but not limited to: real-time inventory information associated with the products at the retail sales facility 170, historical sales information associated with the products at the retail sales facility 170, and a list of products considered to be out-of-stock at the retail sales facility 170. For example, real-time inventory information associated with products at the retail sales facility 170 may include, but is not limited to: data associated with products stored in bins in a stock room of the retail sales facility 170, data associated with products stocked on the sales floor of the retail sales facility 170, products sold at point-of-sale devices (e.g., sale registers) at the retail sales facility 170, and tasks performed by workers with respect to products at the retail sales facility 170.

Figure 2:
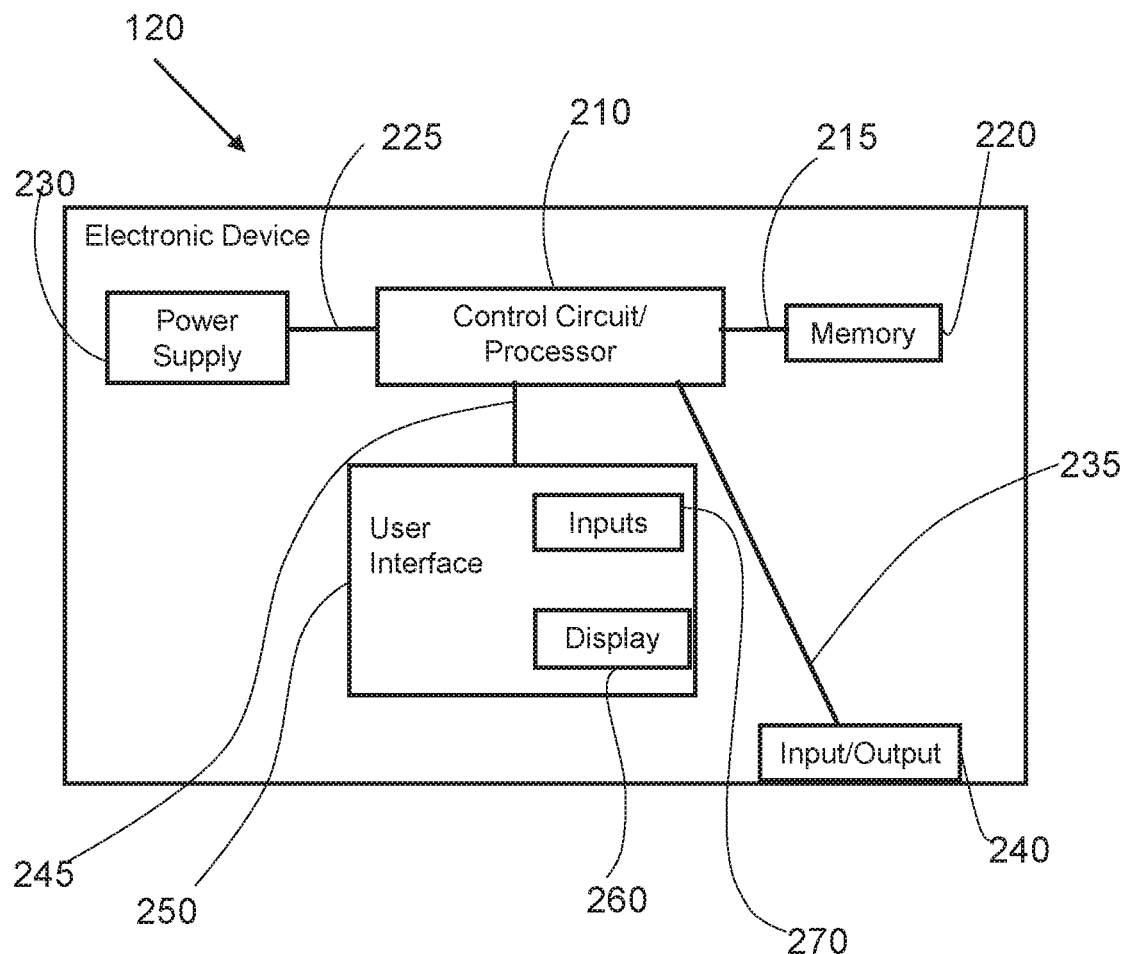
FIG. 2 is a functional diagram of an exemplary electronic inventory management device usable with the system of FIG. 1 in accordance with some embodiments.

With reference to FIG. 2, an exemplary electronic inventory management device 150 configured for use with exemplary systems and methods described herein may include a control circuit or control unit 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control unit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control unit 210 of the electronic inventory management device 150 is also electrically coupled via a connection 235 to an input/output 240 that can receive signals from the order processing server 130 (e.g., data from the consumer information database 140 relating to a product order placed by the consumer 110) or from any other source that can communicate with the electronic inventory management device 150 via a wired or wireless connection. The input/output 240 of the electronic computing device 120 can also send signals to the order processing server 130 (e.g., data including product out-of-stock information regarding the product for which an order is placed by the consumer 110 via the order processing server 130), or to any other device in wired or wireless communication with the electronic inventory management device 150.

In the embodiment shown in FIG. 2, the processor-based control unit 210 of the electronic inventory management device 150 is electrically coupled via a connection 245 to a user interface 250, which may include a visual display or display screen 260 (e.g., LED screen) and/or button input 270 that provide the user interface 250 with the ability to permit an operator of the electronic inventory management device 150 to manually control the electronic inventory management device 150 by inputting commands via touch-screen and/or button operation and/or voice commands to, for example, remove an out-of-stock product ordered by a consumer 110 from a shopping cart of the consumer; add one or more substitute products to the shopping cart of the consumer 110; configure substitute product settings of the consumer 110 that control, for example, automatic ordering of one or more substitute products for the consumer 110 from the retail provider using the system 100, and/or generate a consumer alert 180 to a stocking associate at the retail sales facility 170 or to the consumer 110 indicating that the product ordered by the consumer 110 is out of stock at the retail sales facility 170. It will be appreciated that the performance of such functions by the processor-based control unit 210 of the electronic inventory management device 150 is not dependent on a human operator, and that the control unit 210 may be programmed to perform such functions without a human operator.

In some embodiments, the display screen 260 of the electronic computing device 120 is configured to display various graphical interface-based menus, options, and/or alerts that may be transmitted from the electronic inventory management device 150 to, and displayed on, the electronic computing device 120 in connection with various aspects of the order placed by the consumer 110. The inputs 270 of the electronic inventory management device 150 may be configured to permit an operator to navigate through the on-screen menus on the electronic inventory management device 150 and make changes and/or updates to the product orders and/or substitute product order settings of the consumer 110. It will be appreciated that the display screen 260 may be configured as both a display screen and an input 270 (e.g., a touch-screen that permits an operator to press on the display screen 260 to enter text and/or execute commands.)

In some embodiments, the control unit 210 of the electronic inventory management device 150 may be programmed to generate consumer alerts 180 in connection with the products ordered by the consumer 110 via the order processing server 130. The consumer alerts 180, which will be discussed in more detail below, may be generated by the electronic inventory management device 150 based on information received from the order processing server 130 and/or from the consumer information database 140. In the embodiment shown in FIG. 1, the consumer alerts 180 may be transmitted from the electronic inventory management device 150 via a communication channel 165 (which may be wired or wireless) to the electronic computing device 120 and the electronic computing device 120 may transmit data responsive to the consumer alerts 180 and/or other data to the electronic inventory management device 150 via a communication channel 175 (which may be wired or wireless). It will be appreciated that electronic inventory management device 150 and the electronic computing device 120 may communicate via a single two-way communication channel (wired or wireless) instead of two one-way communication channels 165 and 175.

In some embodiments, the electronic inventory management device 150 at the retail sales facility 170 may itself receive alert signals indicating that one or more products ordered by the consumer are out of stock. For example, in some embodiments, an out of stock alert signal may be generated and transmitted from an electronic scanning device 190 of a worker at the retail sales facility 170 via a two-way communication channel 155 (which may be wired or wireless) to the electronic inventory management device 150 in response to the worker attempting to pick the product ordered by the consumer 110 from a stock room of the retail sales facility 170. Such an alert may be an audible alert (e.g., a beep) or a visual alert (e.g., text-based message) that may be generated at the electronic inventory management device 150. In some embodiments, the out of stock alert signal transmitted from electronic scanning device 190 to the electronic inventory management device 150 includes a notification that a product substitution is needed for the out of stock product.

In some embodiments, the electronic scanning device 190 of FIG. 1 may be an electronic (e.g., hand-held) scanner that may be carried by a worker at the retail sales facility 170. Examples of such electronic scanning devices 190 may include, but are not limited to barcode readers, RFID readers, SKU readers, electronic tablets, cellular phones, or the like mobile electronic devices. Alternatively, the electronic scanning device 190 may be a stationary electronic scanning device installed in the stock room or on the sales floor of the retail sales facility 170. In some embodiments, the electronic scanning device 190 may obtain electronic data associated with the products at the retail sales facility 170 by communicating via a communication channel (e.g., radio waves) with a unique identifying indicia (e.g., barcode, RFID (radio frequency identification), or SKU (stock keeping unit number)) on an exterior of the products or on an exterior of the bins where products are stored at the retail sales facility 170. Alternatively, electronic data associated with the products at the retail sales facility 170 may be manually entered into the electronic scanning device 190 by a worker at the retail sales facility 170.

For example, the electronic scanning device 190, in response to scanning identifying indicia of a product ordered by the consumer 110, may transmit electronic data via the communication channel 155 querying the inventory management database 160 as to inventory status of the product ordered by the consumer 110. Then, in response to receiving electronic data from the inventory management database 160 via the communication channel 155 indicating that the product ordered by the consumer 110 is indicated as being out of stock at the retail sales facility 170, the electronic scanning device 190 may transmit an alert signal to the electronic inventory management device 150 indicating that the product ordered by the consumer 110 is out of stock at the retail sales facility 170. In some embodiments, the control unit 210 of the electronic inventory management device 150 may be programmed, in response to the receipt of such an alert signal from the electronic scanning device 190, to automatically process a replenishment request (e.g., to a product distribution center of the retailer) for the product that was determined to be out of stock at the retail sales facility 170. The replenishment request, when fulfilled, will enable the retail sales facility 170 to replenish the out of stock product and to make this product available to consumers who order this product from the retail sales facility 170

The consumer alerts 180 generated by the electronic inventory management device 150 and transmitted to the electronic computing device 120 of the consumer 110 may include, but are not limited to the following: a notification that the product ordered by the consumer 110 is out of stock at the retail sales facility 170; information relating to various queries, prompts, and/or actions that may need to be taken by the consumer 110 in connection with the out of stock product and/or a potential substitute product; notification of availability of one or more retail provider-selected or consumer-preselected product substitutes if the product ordered by the consumer 110 is not available as a result of being out-of-stock, discontinued, or the like; a notification of additions to/deletions from the virtual product shopping cart of the consumer 110; notification of shipment and/or delivery of a product ordered by the consumer 110 and/or the substitute product selected by the consumer 110; notification of shipment of a substitute product automatically ordered for the consumer 110 via the system 100 based on the substitute order settings of the consumer 110 if the consumer 110 does not respond to a consumer alert 180 within a period of time predefined by the retail provider; and a notification of availability of other recommended products for the consumer 110, including but not limited to: coupons, sale offers, and/or one or more products specifically targeted to the consumer 110 based on at least one product in the consumer's virtual product shopping cart and/or consumer's shopping history.

In some embodiments, the consumer alerts 180 that may be transmitted by the electronic inventory management device 150 (or an intermediary electronic device) to the electronic computing device 120 may include but are not limited to short message service (SMS) messages, electronic mail (e-mail) messages, voice mail messages, push notifications (to a mobile application installed on the electronic computing device 120) and/or electronic catalog information. In some embodiments, the control unit 210 of the electronic inventory management device 150 may be programmed to send an electronic query (e.g., via SMS, email, push notification, or the like) to the electronic computing device 120. For example, such an electronic query may ask the consumer 110 to respond by indicating, for example, via a graphical consumer access interface on a display screen of the electronic computing device 120, whether the consumer 110 is willing to accept one or more substitute product instead of the out of stock product ordered by the consumer 110. The electronic query may include a clickable link, a photograph, and/or a video of the one or more substitute product for the consumer 110 to click on and/or view to get additional information regarding the substitute product, if desired.

In some embodiments, for consumers 110 that are existing customers of the retailer and have an established order history in the consumer information database 140, the control unit 210 of the electronic inventory management device 150 may be programmed to obtain the historical purchase data associated with the consumer 110 from the consumer information database 140. Based on such historical purchase data associated with the consumer 110 obtained from the consumer information database 140, the control unit 210 of the electronic inventory management device 150 may be programmed to generate a selection option of one or more substitute products for the out of stock product ordered by the consumer 110. In some embodiments, if the consumer 110 is a new customer of the retailer and no historical data for such a consumer 110 is stored in the consumer information database 140, the control unit of the electronic inventory management device 150 may be programmed to obtain historical purchase data associated with other consumers 110 of the retailer (e.g., who purchased products via the order processing server 130 or at the retail sales facility 170), and to generate the selection option of one or more substitute products for such new consumers 110 based on the obtained historical purchase data associated with other consumers 110.

In some embodiments, the control unit 210 of the electronic inventory management device 150 may be programmed to set a predetermined time interval for the consumer to accept the selection option of the at least one substitute product included in a consumer alert 180 sent to the electronic computing device 120 of the consumer 110. Such a predetermined time interval may be chosen to give a consumer 110 enough time to answer the query presented to the consumer 110 in the consumer alert 180 without unnecessarily delaying the delivery of a substitute product to the consumer 110 instead of the out of stock product. For example, in some embodiments, the time interval may be set in minutes, e.g., 15 minutes, 30 minutes, 45 minutes, or 60 minutes, and in other embodiments, the time interval may be set in hours, e.g., 2 hours, 3 hours, 4 hours, 5 hours, or 6 hours. The predetermined time interval after which a substitute product is automatically delivered to the consumer 110 if the consumer 110 does not respond to the consumer alert 180 within the predetermined time interval may be: set by the retailer via the electronic inventory management device 150; automatically generated by the control unit 210; and/or predefined by the consumer 110 via the graphical consumer access interface of the electronic computing device 120.

In one approach, the control unit 210 of the electronic inventory management device 150 may be programmed to trigger an automatic delivery of the one or more substitute product to the consumer 110 if the predetermined time interval elapses without the consumer 110 responding to the consumer alert 180 to indicate either agreement to receive the one or more substitute product or a refusal to accept a substitute product. In some embodiments, the control unit 210 of the electronic inventory management device 150 may be programmed not to trigger an automatic delivery of a substitute product to the consumer 110 if no response from the consumer 110 is received within the predetermined time interval, but to require a manual input by an operator of the electronic inventory management device 150 indicating either a decision to deliver or not to deliver the substitute product to the consumer 110. In another approach, the control unit 210 of the electronic inventory management device 150 may be programmed to trigger delivery of the one or more substitute product to the consumer 110 after receiving, within the predetermined time interval, an electronic message from the electronic computing device 120 of the consumer indicating that the consumer 110 accepts the one or more substitute product.

In one embodiment, if the consumer does not wish to accept the substitute product offered to the consumer in the consumer alert 180 and responds to the consumer alert 180 within the predetermined interval of time accordingly, the control unit 210 of the electronic inventory management device 150 is programmed to transmit an electronic message (e.g., SMS, e-mail, push notification, or the like) to the electronic computing device 120 of the consumer 110 including a generated selection option of at least one similarly priced different product that is not a substitute for the out of stock product ordered by the consumer 110. In one approach, the control unit 210 of the electronic inventory management device 150 is programmed to generate a similarly priced different product based either on obtained historical purchase data associated with the consumer 110 in the consumer information database 140, or based on historical purchase data associated with other consumers in the consumer information database 140.

In an embodiment, if the consumer does not wish to accept the substitute product offered to the consumer in the consumer alert 180 and responds to the consumer alert 180 within the predetermined interval of time accordingly, then refuses to accept a similarly priced different product that is not a substitute for the product ordered by the consumer 110, the control unit 210 of the electronic inventory management device 150 may be programmed to transmit an electronic message (e.g., SMS, e-mail, push notification, or the like) to the electronic computing device 120 of the consumer 110 including a query for the consumer 110 as to whether to refund payment for the processed order for the out of stock product, or whether the consumer 110 is willing to retain the money paid for the out of stock product as store credit to enable the consumer 110 to buy a product that is completely different both in kind and in price to the out of stock product. If the consumer 110 responds to the consumer alert 180 by indicating a desire to receive a refund, the consumer's response may be transmitted (via communication channel 175) to the electronic inventory management device 150, which would then transmit a signal (via communication channel 135) to the order processing server 130 to process the refund. In some embodiments, the control unit 210 of the electronic inventory management device 150 may be programmed to recognize the shopping patterns of the consumer 110 when responding to the consumer alerts 180, and to record the shopping patterns of the consumer in the consumer information database 140, such that future substitute product offers to the consumer 110 may be closer matched to the learned preferences/patters of the consumer 110.

In some embodiments, the system 100 may be available to and accessible by the consumers 110 via desktop-based electronic computing devices 120 using desktop-based (e.g., Windows or Mac) operating systems, or via mobile-based electronic computing devices 120 using mobile-based operating systems such as IOS and Android. For example, a consumer 110 having a previously established account with a retail provider may initially connect to the order processing server 130 of the system 100 via a dot.com access (e.g., via the retail provider's dedicated website) by using a unique identification, for example, a login/password combination selected by the consumer 110 when establishing the consumer's account with the retail provider.

In some embodiments, when a consumer 110 initially sets up an online account with the retail provider, the system 100 (i.e., order processing server 130 or another server on the system 100 dedicated to new consumer sign-up) is configured to permit the consumer 110 to generate a consumer profile including personal information of the consumer 110 (e.g., name, address, phone number, and the like), payment methods (e.g., credit card information), as well as substitute product settings of the consumer 110 (e.g., what products may or may not be offered to the consumer 110 if the product ordered by the consumer from the retail provider is out of stock at the retail sales facility 170). It will be appreciated that the consumer 110 may select new options and/or update previously selected options at any time after setting up the account with the retail provider. In some embodiments, the personal information of the consumer 110 and any options selected by the consumer 110 are stored in the consumer information database 140 for subsequent retrieval by the order processing server 130 (e.g., in response to a login request or product order placement by the consumer 110).

In some embodiments, as the consumer 110 is connecting to the retail provider's website (e.g., via a login interface), the order processing server 130 of the retail provider may request a verification of the identity (e.g., username/password) of the consumer 110. The order processing server 130 may first verify the identity of the consumer 110 (e.g., by comparing the username/password data entered by the consumer 110 into the login interface against username/password data in the profile of the consumer 110 stored in the consumer information database 140). The order processing server 130 may then associate the consumer profile with the identity of the consumer 110, retrieve the consumer profile from the consumer information database 140 based on information stored in the profile of the consumer 110, and send the retrieved account information of the consumer 110 to a software-implemented graphical consumer access interface that is displayed to the consumer 110 on the electronic computing device 120.

In some embodiments, the graphical consumer access interface displayed to the consumer 110 on the electronic computing device 120 may include one or more graphical input fields in the form of menu options and/or sub-interfaces that permit the consumer 110 to order one or more products via the order processing server 130, as well as update the customer's account information, alert notifications, and substitute product order settings stored in the consumer information database 140. For example, in response to the consumer 110 entering and/or changing the consumer's personal information via the graphical consumer access interface, the electronic computing device 120 may be configured to send a request to the order processing server 130 to update the consumer information database 140 to reflect the changes made to the personal information of the consumer 110. In one approach, the graphical consumer access interface is configured to permit the consumer 110 to cause the electronic computing device 120 to transmit an information update request indicating the consumer's substitute product order settings to the order processing server 130. In response to such a request, the order processing server 130 is configured to update the substitute product order settings of the consumer 110 in the consumer information database 140 to reflect the requested changes transmitted from the electronic computing device 120 to the order processing server 130.

In some embodiments, the graphical customer access interface on the electronic computing device 120 of the consumer 110 may be a mobile application (app) associated with the retail provider and configured to display various above-described notifications and alerts from the retail provider to the consumer 110. Such consumer alerts 180 may be, for example, transmitted to the electronic computing device 120 from the electronic inventory management device 150 (via communication channel 165) and/or from the order processing server 130 (via communication channel 125). For example, one consumer alert 180 that may be displayed by the graphical consumer access interface on the electronic computing device 120 of the consumer 110 is a notification (sent via SMS or e-mail) of availability of one or more retail provider-selected or consumer-preselected product substitutes if the product ordered by the consumer 110 is not available as a result of being out-of-stock, discontinued, or the like.

As discussed above, the graphical consumer access interface on the electronic computing device 120 of the consumer 110 is configured to permit the consumer 110 to enter, change, and/or update substitute product preferences of the consumer 110. For example, the consumer may use the graphical consumer access interface to create and/or modify a virtual (e.g., graphical) shopping cart including one or more products that the consumer 110 is interested in automatically ordering as substitute products if certain products ordered by the consumer are determined by the electronic inventory management device 150 to be out of stock at the retail sales facility 170. In addition, the graphical consumer access interface may be configured to permit the consumer 110 to click on links to the substitute products offered to the consumer 110 in the consumer alerts 180, enabling the consumer 110 to view additional information associated with such products, purchase such products, to decline an offer to purchase such products and/or to cancel the original order made by the consumer 110 for the out of stock product.

Figure 3:
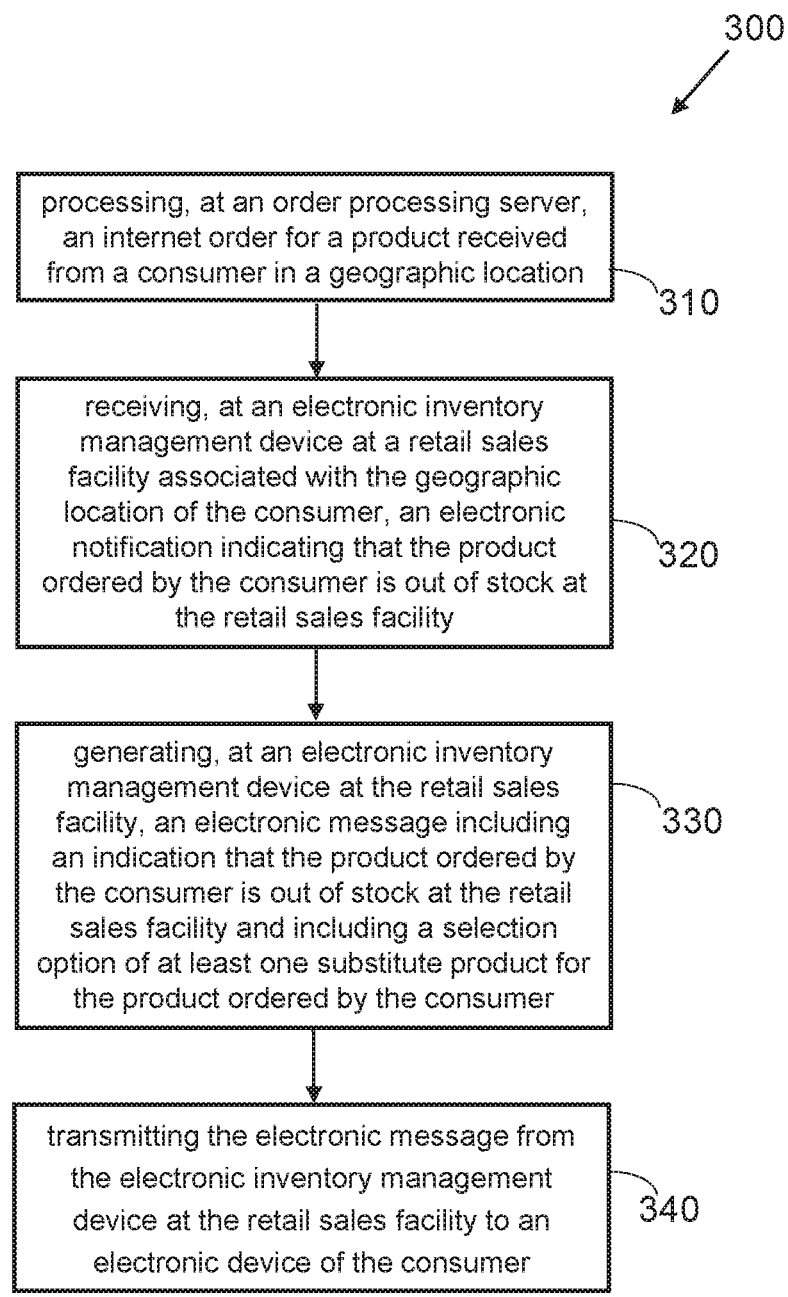
FIG. 3 is a flow chart diagram of a process of enabling consumers to purchase substitute products when the products ordered by the consumers are out of stock in accordance with some embodiments.

FIG. 3 shows an embodiment of a method 300 of enabling consumers 110 to purchase substitute products when the products ordered by the consumers 110 are out of stock is shown. After a consumer 110 places an internet order for a product via the order processing server 130 of the retail provider, the method 300 includes processing, at the order processing server 130, the internet product order received from the consumer 110 (step 310). In one embodiment, when placing the order for the product, the consumer 110 provides a shipping address where the product ordered by the consumer 110 is to be delivered. The shipping address may be a home or office address of the consumer 110, or an address of someone for whom the consumer 110 ordered the product as a gift. As such, during the processing of the consumer's order, the order processing server 130 obtains a defined geographic location of the consumer 110, or of another person who is the recipient of the product ordered by the consumer 110.

In some embodiments, after an order for a product placed by the consumer 110 is processed, the order processing server 130 transmits the processed order information in an order fulfillment request to an electronic inventory management device 150 at a retail sales facility 170 in the geographic location of the consumer 110. The retail sales facility 170 may have one or more electronic inventory management devices 150, which are in communication with the order processing server 130, and which may generate tasks (i.e., actions to be taken by workers at the retail sales facility 170) relative to the product ordered by the consumer 110. One such task may include a worker picking (i.e., removing) the ordered product from a bin in a stock room of the retail sales facility 170 and processing the picked product for delivery to the consumer 110. The task of picking a product by a worker at the retail sales facility 170 may require the worker to enter data identifying the ordered product into the electronic scanning device 190 (e.g., via manual entry or via scanning of identifying indicia of the ordered product). The inventory management database 160 at the retail sales facility 170 may then receive a query from the electronic scanning device 190 of the worker, requesting the inventory management database 160 to confirm that this product is in stock at the retail sales facility 170.

In situations, where the ordered product is indicated by the inventory management database 160 to be out of stock at the retail sales facility 170, the exemplary method 300 includes receiving, at the electronic inventory management device 150 at the retail sales facility 170 associated with the geographic location of the consumer 110, an electronic notification indicating that the product ordered by the consumer 110 is out of stock at the retail sales facility 170, as shown in step 320 of FIG. 3. In one embodiment, such an electronic notification or alert is received at the electronic inventory management device 150 from the electronic scanning device 190 of a worker. As mentioned above, the electronic notification or alert transmitted by the electronic scanning device 190 to the electronic inventory management device 150 may also include an indication that a substitution of a product for the out of stock product is needed.

In the embodiment shown in FIG. 3, an out of stock electronic notification is received at the electronic inventory management device 150 from the electronic scanning device 190, the control unit 210 of the electronic inventory management device 150 generates an electronic message (e.g., a consumer alert 180) including an indication that the product ordered by the consumer 110 is out of stock at the retail sales facility 170 and also including a selection option of at least one substitute product for the product ordered by the consumer 110 (step 330). As shown in FIG. 3, the method 300 then includes transmitting the electronic message from the electronic inventory management device 150 to the electronic computing device 120 of the consumer 110 (step 340). As explained above, the consumer alert 180 may be an SMS message, e-mail, push notification, or the like, and may include one or more of the following response-requiring queries for the consumer 110: a query asking the consumer 110 to respond by indicating whether the consumer 110 is willing to accept the at least one substitute product instead of the ordered out of stock product, a clickable link to the at least one substitute product, a picture of the at least one substitute product, and/a video of the at least one substitute product.

The consumer alert 180 transmitted from the electronic inventory management device 150 to the electronic computing device 120 of the consumer 110 may be displayed in the graphical consumer access interface (e.g., within an installed app made available by the retailer) on the electronic computing device 120 of the consumer 110. In some embodiments, as the consumer alert 180 and the notifications and queries contained therein are displayed to the consumer in the graphical consumer access interface on the electronic computing device 120, the consumer 110 is permitted to reply to the queries, click on any links to substitute products, and to choose menu options indicating whether the consumer 110 agrees or does not agree to purchase the substitute product. If the consumer 110 agrees, a signal indicating such agreement to purchase the substitute product is transmitted from the electronic computing device 120 to the order processing server 130, and an order for the substitute product is processed.

The systems and methods described herein advantageously provide for easy, creation and personalization of product order settings by consumers and generation of real time consumer alerts that permit the retailers to query consumers whether consumers agree to receive one or more substitute products instead of out of stock products before the retailers incur the expense of shipping the substitute products to the consumers. In addition, the systems and methods described herein advantageously provide for customization and personalization of the consumers' shopping process, allowing the consumers to preselect substitute products which they are willing to receive in the event that the products ordered by the consumers are out of stock. As such, the systems and methods described herein may advantageously save consumers that order products from retailers the frustration of not receiving a product that they ordered and instead receiving a substitute product selected by the retailer without asking for the consumer's agreement to such a substitute product. In addition, the systems and methods described herein may advantageously increase customer satisfaction with the retailers and may avoid situations where consumers turns to other retailers when the retailer who originally received the product order is unable to provide the ordered product due to an out of stock issue.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system of enabling consumers to purchase substitute products when the products ordered by the consumers are out of stock, the system comprising:
   an order processing server configured to receive an internet order for a product from a consumer in a geographic location;
   an electronic inventory management electronic device at a retail sales facility associated with the geographic location of the consumer;
   an inventory management database configured to store electronic data associated with product inventory at the retail facility;
   an electronic scanning device configured to:
      permit a worker at the retail sales facility to scan an identifying indicia of the product ordered by the consumer;
      transmit an electronic signal representing a query to the inventory management database regarding inventory status of the product ordered by the consumer;
      in response to receipt, from the inventory management database, of electronic data indicating that the product ordered by the consumer is out of stock at the retail sales facility, generate an alert signal including an electronic notification indicating that the product ordered by the consumer is out of stock at the retail sales facility; and transmit the alert signal to the electronic inventory management device;

wherein the electronic inventory management device includes a processor-based control unit configured to:

receive, from the electronic scanning device, the alert signal including the electronic notification indicating that the product ordered by the consumer is out of stock at the retail sales facility;

generate an electronic message including an indication that the product ordered by the consumer is out of stock at the retail sales facility and including a selection option of at least one substitute product for the product ordered by the consumer; and transmit the electronic message to an electronic computing device of the consumer;

set a predetermined time interval for the consumer to accept the selection option of the at least one substitute product;

after not receiving a response within the predetermined time interval from the electronic device of the consumer indicating an acceptance of the selection option of the at least one substitute product, trigger a delivery to the consumer of the at least one substitute product after the predetermined time interval elapses; and after receiving an electronic message within the predetermined time interval from the electronic device of the consumer indicating that the consumer accepts the at least one substitute product, trigger a delivery to the consumer of the at least one substitute product accepted by the consumer.

2. The system of claim 1, wherein the order processing server is further configured to receive and process payment for the product from the consumer and transmit a fulfillment request for the processed order to the electronic inventory management device.

3. The system of claim 1, wherein the control unit is further configured to receive an alert signal from a scanning device of a worker at the retail sales facility generated in response to the worker attempting to pick the product ordered by the consumer, the alert signal including the electronic notification indicating that the product ordered by the consumer is out of stock at the retail sales facility.

4. The system of claim 1, wherein the electronic message further comprises at least one of: a query for the consumer asking the consumer to respond by indicating whether the consumer is willing to accept the at least one substitute product instead of the product ordered by the consumer; a clickable link to the at least one substitute product, a picture of the at least one substitute product, and a video of the at least one substitute product.

5. The system of claim 1, wherein the control unit is further configured to obtain historical purchase data associated with the consumer and generate the selection option of the at least one substitute product based on the obtained historical purchase data associated with the consumer.

6. The system of claim 5, wherein the control unit is further configured to, when the historical purchase data associated with the consumer is not available, obtain historical purchase data associated with other consumers of the retail sales facility, and generate the selection option of the at least one substitute product based on the obtained historical purchase data associated with other consumers of the retail sales facility.

7. The system of claim 1, wherein the control unit is further configured to, after receiving an electronic message from the electronic device of the consumer within the predetermined interval of time indicating that the consumer does not accept the at least one substitute product, transmit an electronic message to the electronic device of the consumer including a generated selection option of at least one similarly priced different product that is not a substitute for the product ordered by the consumer, the at least one similarly priced different product being generated based on one of obtained historical purchase data associated with the consumer and obtained historical purchase data associated with other consumers of the retail sales facility.

8. The system of claim 7, wherein the control unit is further configured to, after receiving an electronic message from the electronic device of the consumer indicating that the consumer does not accept the at least one similarly priced different product, transmit an electronic message to the electronic device of the consumer including a query for the consumer whether to refund payment for the processed order, and process a refund for the order placed by the consumer in response to receiving a message from the electronic device of the consumer indicating agreement to the refund.

9. The system of claim 1, wherein the electronic message comprises at least one of a push notification to a mobile application installed on the electronic device of the consumer, a text message, and an electronic email.

10. A method of enabling consumers to purchase substitute products when the products ordered by the consumers are out of stock, the method comprising:

processing, at an order processing server, an internet order for a product received from a consumer in a geographic location;

providing an electronic inventory management device at a retail sales facility associated with the geographic location of the consumer;

providing an inventory management database configured to store electronic data associated with product inventory at the retail facility;

providing an electronic scanning device;

permitting a worker at the retail sales facility to scan, using the electronic scanning device, an identifying indicia of the product ordered by the consumer;

transmitting, from the electronic scanning device, an electronic signal representing a query to the inventory management database regarding inventory status of the product ordered by the consumer;

in response to receipt, from the inventory management database, of electronic data indicating that the product ordered by the consumer is out of stock at the retail sales facility, generating, via the electronic scanning device, an alert signal including an electronic notification indicating that the product ordered by the consumer is out of stock at the retail sales facility; and transmitting the alert signal to the electronic inventory management device;

receiving, at the electronic inventory management device, the alert signal including the electronic notification indicating that the product ordered by the consumer is out of stock at the retail sales facility;

generating, at an electronic inventory management device at the retail sales facility, an electronic message including an indication that the product ordered by the consumer is out of stock at the retail sales facility and including a selection option of at least one substitute product for the product ordered by the consumer;

transmitting the electronic message from the electronic inventory management device at the retail sales facility to an electronic computing device of the consumer;

setting, via the electronic inventory management device, a predetermined time interval for the consumer to accept the selection option of the at least one substitute product;

after receiving an electronic message within the predetermined time interval from the electronic device of the consumer indicating that the consumer accepts the at least one substitute product, triggering, via the electronic inventory management device, a delivery to the consumer of the at least one substitute product accepted by the consumer; and after not receiving a response within the predetermined time interval from the electronic device of the consumer indicating an acceptance of the selection option of the at least one substitute product, triggering, via the electronic inventory management device, a delivery to the consumer of the at least one substitute product after the predetermined time interval elapses.

11. The method of claim 10, wherein the processing step further comprises receiving and processing payment for the product from the consumer and transmitting a fulfillment request for the processed order from the order processing server to the electronic inventory management device at the retail sales facility.

12. The method of claim 10, wherein the receiving step further comprises, receiving at the electronic inventory management device at the retail sales facility, an alert signal from a scanning device of a worker at the retail sales facility generated in response to the worker attempting to pick the product ordered by the consumer, the alert signal including the electronic notification indicating that the product ordered by the consumer is out of stock at the retail sales facility.

13. The method of claim 10, wherein the generating the electronic message further comprises including in the electronic message at least one of: a query for the consumer asking the consumer to respond by indicating whether the consumer is willing to accept the at least one substitute product instead of the product ordered by the consumer; a clickable link to the at least one substitute product, a picture of the at least one substitute product, and a video of the at least one substitute product.

14. The method of claim 10, wherein the generating step further comprises obtaining historical purchase data associated with the consumer and generating the selection option of the at least one substitute product based on the obtained historical purchase data associated with the consumer.

15. The method of claim 14, wherein the generating step further comprises, when the historical purchase data associated with the consumer is not available, obtaining historical purchase data associated with other consumers of the retail sales facility, and generating the selection option of the at least one substitute product based on the obtained historical purchase data associated with other consumers of the retail sales facility.

16. The method of claim 10, further comprising, after receiving an electronic message from the electronic device of the consumer within the predetermined interval of time indicating that the consumer does not accept the at least one substitute product, transmitting an electronic message to the electronic device of the consumer including a generated selection option of at least one similarly priced different product that is not a substitute for the product ordered by the consumer, the at least one similarly priced different product being generated based on one of obtained historical purchase data associated with the consumer and obtained historical purchase data associated with other consumers of the retail sales facility.

17. The method of claim 16, further comprising, after receiving an electronic message from the electronic device of the consumer indicating that the consumer does not accept the at least one similarly priced different product, transmitting an electronic message to the electronic device of the consumer including a query for the consumer whether to refund payment for the processed order, and processing a refund for the order placed by the consumer in response to receiving a message from the electronic device of the consumer indicating agreement to the refund.

18. The method of claim 10, wherein the transmitting step further comprises transmitting the electronic message as at least one of a push notification to a mobile application installed on the electronic device of the consumer, a text message, and an electronic email.

* * * * *